(No Model.)  3 Sheets—Sheet 1.
F. B. MILES.
MECHANISM FOR OPERATING CLUTCHING AND BELT SHIFTING DEVICES.
No. 439,080.  Patented Oct. 21, 1890.
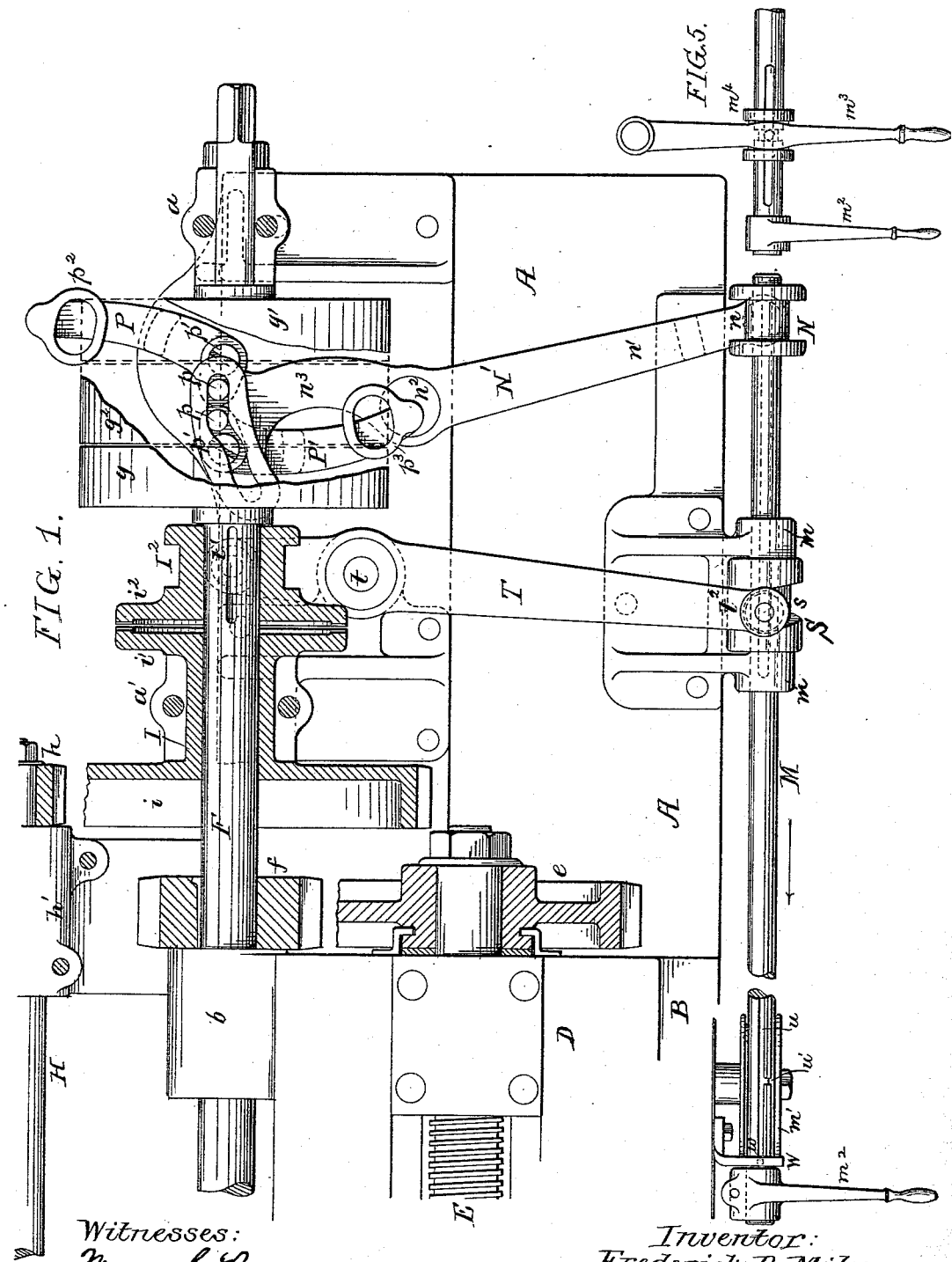
Witnesses:
Murray C. Boyer.
A. V. Groupe
Inventor:
Frederick B. Miles
by his Attorneys
Howson & Howson (No Model.) 3 Sheets—Sheet 2.
F. B. MILES.
MECHANISM FOR OPERATING CLUTCHING AND BELT SHIFTING DEVICES.
No. 439,080. Patented Oct. 21, 1890.
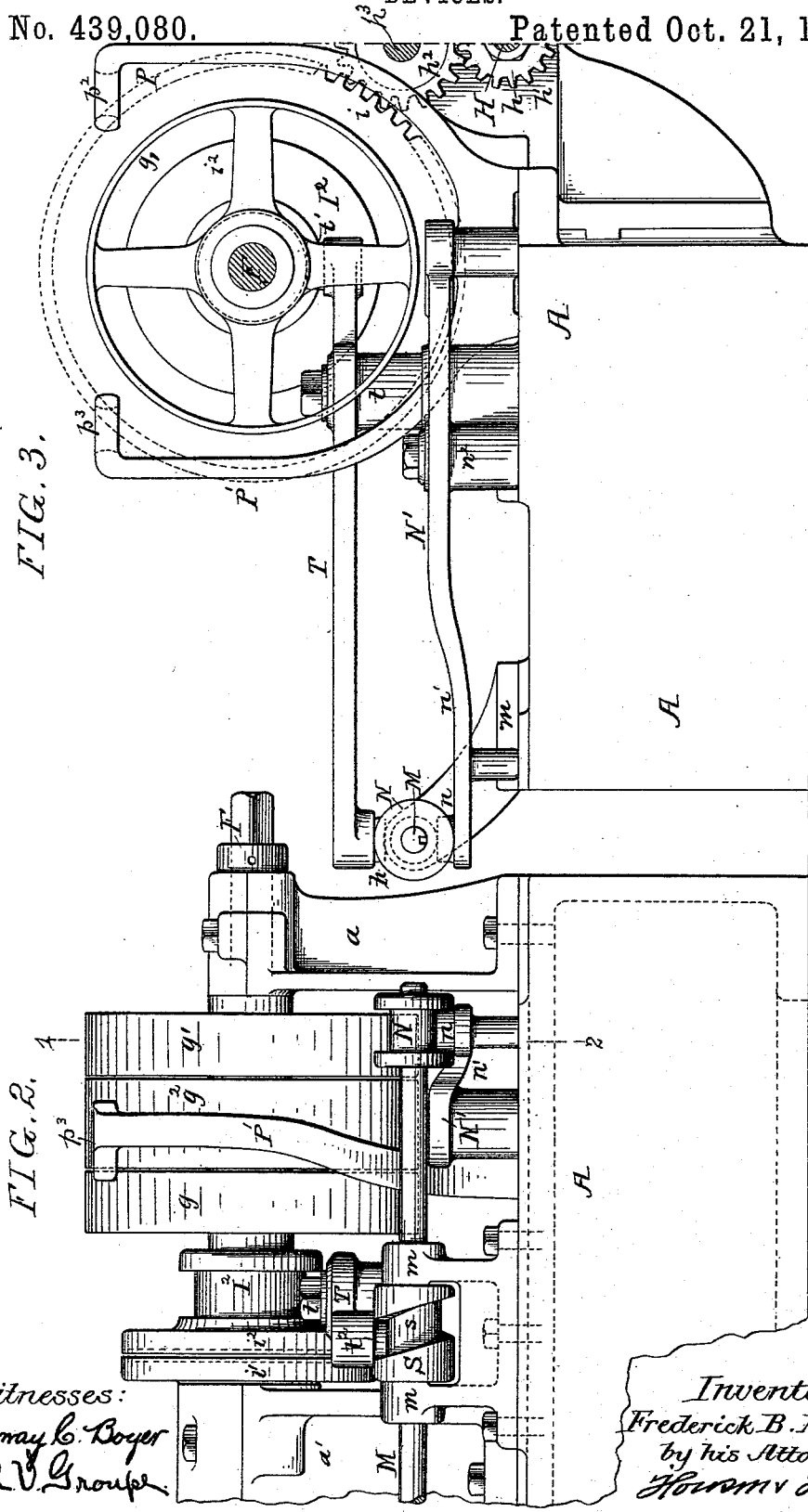
Witnesses:
Murray C. Boyer
A. V. Groupe
Inventor:
Frederick B. Miles
by his Attorneys
Howson & Howson (No Model.) 3 Sheets—Sheet 3.
F. B. MILES.
MECHANISM FOR OPERATING CLUTCHING AND BELT SHIFTING DEVICES.
No. 439,080. Patented Oct. 21, 1890.
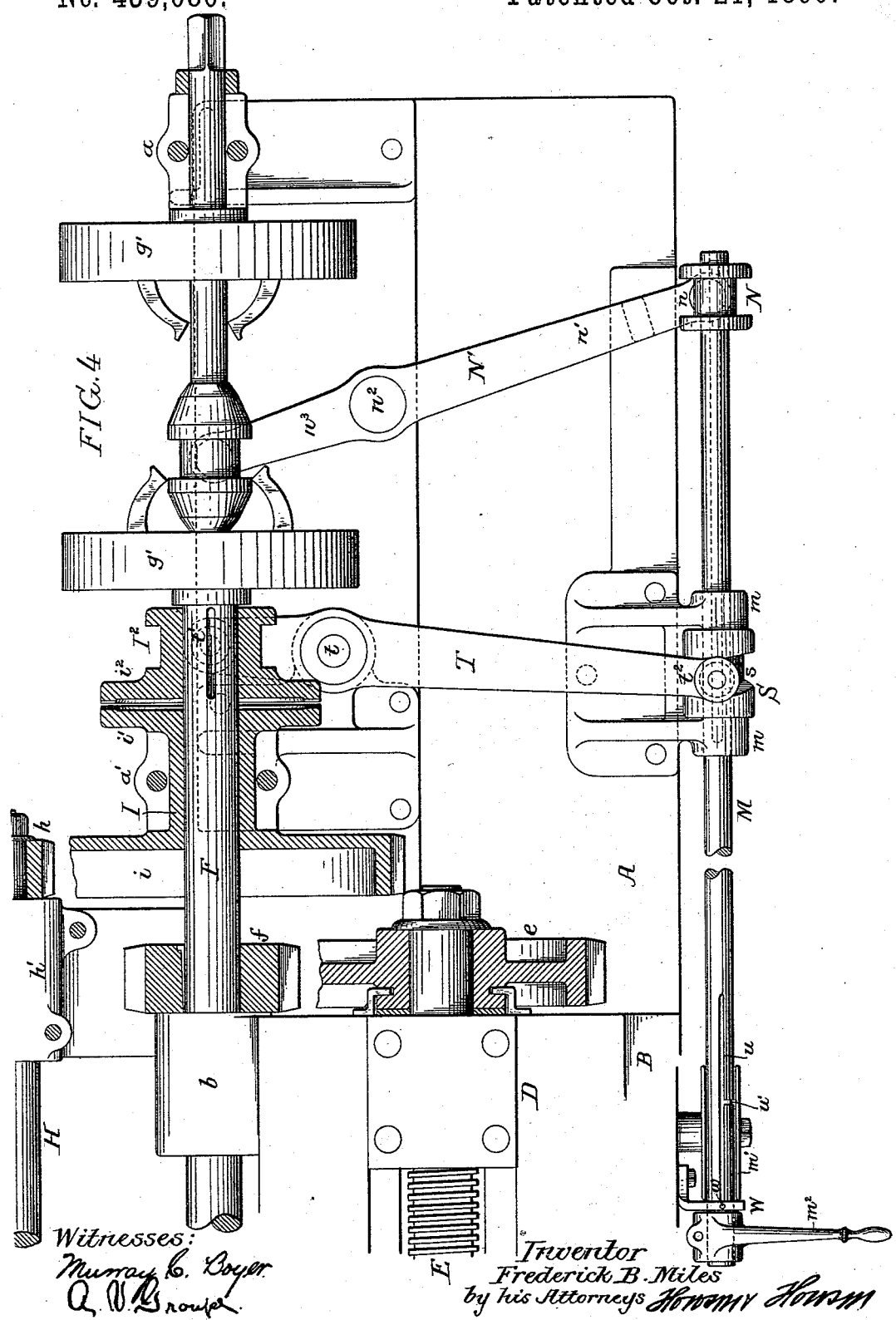
Witnesses:
Murray C. Boyer
Q. V. Groupe
Inventor
Frederick B. Miles
by his Attorneys Howson & Howson

UNITED STATES PATENT OFFICE.

FREDERICK B. MILES, OF PHILADELPHIA, PENNSYLVANIA, ASSIGNOR TO HIMSELF, CLARENCE S. BEMENT, WILLIAM P. BEMENT, AND FRANK BEMENT, ALL OF SAME PLACE.

MECHANISM FOR OPERATING CLUTCHING AND BELT-SHIFTING DEVICES.

SPECIFICATION forming part of Letters Patent No. 439,080, dated October 21, 1890.

Application filed June 30, 1890. Serial No. 357,290. (No model.)

*To all whom it may concern:*

Be it known that I, FREDERICK B. MILES, a citizen of the United States, residing in Philadelphia, Pennsylvania, have invented certain Improvements in Mechanism for Operating Clutching and Belt-Shifting Devices, of which the following is a specification.

The object of my invention is to operate clutching and belt-shifting mechanism from a single shaft.

My invention is especially applicable to the feed-gear of a gun-lathe in which a slow feed is required for boring and a quick forward and return feed for clearing and adjusting; but it will be understood that the device can be applied to other machines without departing from my invention.

In the accompanying drawings, Figure 1 is a plan view, partly in section, of the tail end of a gun-lathe, illustrating my invention. Fig. 2 is a side elevation of Fig. 1. Fig. 3 is a transverse section on the line 1 2, Fig. 2. Fig. 4 is a view of a modification; and Fig. 5 is a view in detail, showing two handles for operating the shifting-rod.

A is the base of the machine, and B the boring-bench, on which the carriage D slides.

E is the feed-screw, having at its rear end a gear-wheel $e$, meshing with a pinion $f$ on a shaft F. On this shaft F are the fast and loose pulleys and the clutch-gears. The shaft F is adapted to a bearing $b$ on the boring-bench B and to bearing $a$ on the base of the machine.

Mounted on the shaft F are the loose pulleys $g$ $g'$ and the fast pulley $g^2$.

Running the full length of the machine is a shaft H, being geared, preferably, to the spindle in the head-stock of the lathe. This shaft is adapted to bearings $h'$, (only one of which is shown,) and has at its rear end a pinion $h$, gearing with an intermediate pinion $h^2$ on a stud $h^3$, which is adjustable from and toward the pinion $h$ in a manner common to this class of machines when it is required to change the feed of the tail-stock or boring-tool. This intermediate pinion $h^2$ meshes with a gear-wheel $i$ on a sleeve I, adapted to the bearings $a'$ and to the shaft F. On the opposite end of the sleeve I is a clutch-disk $i'$, having teeth which can engage with the teeth of the disk $i^2$ on the sleeve $I^2$, which is splined to the shaft F, having an independent longitudinal movement thereon, the sleeve I being loose on the shaft but confined longitudinally, so that it will be seen on moving the sleeve $I^2$ in gear with the sleeve I it and the shaft F will be rotated, and consequently this rotation will be transferred through the pinion $f$ and gear-wheel $e$ to the feed-screw E, feeding the carriage slowly forward or slowly rotating the cutting or drill spindle.

Usually the slow feed has been operated independently of and by means entirely separate from that used in shifting the belt from the quick forward and return feed, and it is the object of my present invention to so confine the shifting-gear that with one shaft the attendant can operate either one or other of the devices, as fully described hereinafter.

Extending in front of the machine is an operating rod or shaft M, adapted to bearings $m$ on the rear end of the machine and supported at intervals by rollers $m'$. This rod has a handle $m^2$, by which it can be moved either longitudinally or partially rotated. The shaft or rod is splined at its rear end, and adapted to this splined portion is a feathered sleeve S, having a cam-groove $s$. On the end of the shaft is a grooved sleeve N, as shown, and adapted to the groove is a pin $n$ on the arms $n'$ of a lever N', pivoted at $n^2$ to the base of the machine. The opposite arm $n^3$ of this lever is slotted, said slot being in the form of a cam, and adapted to the slot are pins $p$ $p$ of two levers P P', which are pivoted at $p'$ to the base of the machine and have belt-shifting eyes $p^2$ $p^3$ at their upper ends. One belt passes through one of these eyes and another belt passes through the other eye, one of the belts moving in one direction and the other belt moving in the opposite direction. By moving the rod M in the direction of its arrow, Fig. 1, the belt passing through the eye $p^3$ will first be shifted onto the loose pulley $g$, which would stop the rotation of the shaft F. If the rod be moved farther in the same direction, the belt passing through the eye $p^2$ will be shifted onto the tight pulley $g^2$ and cause the shaft F to rotate in the opposite direction. If the several parts are in the positions shown in the drawings, the belt that would pass through the eye $p^2$ would be on a loose pulley $g'$ and the belt that would pass through the eye $p^3$ would be on a fast pulley $g^2$. By moving the lever N' to a central position both belts would be shifted onto loose pulleys and the slow feed through the medium of the clutch could be thrown in.

T is a lever pivoted at $t$. One arm of this lever has a pin $t'$ engaging with the groove in the loose clutch-sleeve $I^2$. The other arm of the lever has a pin $t^2$ engaging with the cam-groove $s$ in the cam-sleeve S on the rod M. By turning the rod the cam-sleeve will be turned, and, owing to the shape of its groove, will throw the teeth of the clutch-sleeve $I^2$ in gear with the teeth of the clutch-sleeve I, and consequently the slow feed will be thrown in gear with the feed-screw E. Thus it will be seen that by moving the rod M longitudinally in one direction there will be a quick forward feed, and by moving it longitudinally in the opposite direction there will be a quick return-feed, and by turning the shaft without longitudinal motion there will be a slow forward feed.

In the rod M is a longitudinal groove $u$ and a transverse groove $u'$. Adapted to the grooves is a pin $w$ on a bracket W, as shown in Fig. 1. The object of this construction is to prevent the rod being longitudinally moved or turned when it is not in the proper position, so that it will be impossible to shift the clutch until the belts are in proper position, or vice versa.

In some instances, instead of the fast and loose pulleys, friction-pulleys with cross and open belts may be used, as shown in Fig. 4, and instead of shifting the belts, as described, the operating-rod M would by its longitudinal motion actuate the friction-clutches to engage either pulley, as desired, for producing motion in the required direction.

In place of the single shifting-handle two handles may be used—one handle $M^2$ for operating the clutch and the other handle $M^3$ for operating the mechanism of the belt-pulleys, as shown in Fig. 5. The rod is grooved both longitudinally and transversely, and a pin on the sleeve $M^4$ is adapted to this slot, so that one lever cannot be moved until the other lever is in a certain position.

I claim as my invention—

1. The combination, in clutching and releasing mechanism, of two independent driving parts and a driven part adapted to be driven by either of the two driving parts, operating-levers for the parts to throw them into and out of gear with the driven part, and a single rod controlling both levers, substantially as described.

2. The combination, in the clutching and releasing mechanism, of a clutch, fast and loose pulleys, a lever for operating the clutch, and a shifting-lever for shifting the belt, with a shaft or rod controlling both the clutch-lever and the shifting-lever, substantially as described.

3. The combination of the shaft, a clutch-sleeve geared to a driving mechanism and loose on the shaft, an opposite clutch-sleeve adapted to slide on but turn with the shaft, pulleys on said shaft, a lever engaging with the movable clutch-sleeve, a shifting-lever, a rod or shaft having a sleeve fixed thereto, and a sleeve adapted to be turned with the shaft, but through which the shaft can slide, one sleeve actuating the shifting-lever and the other sleeve actuating the clutch-lever, substantially as described.

4. The combination of the shaft F, the sleeve I thereon, a gear on said sleeve meshing with a gear on the slow-feed shaft, a sleeve $I^2$, free to move longitudinally on the shaft E, but adapted to turn therewith, a lever for moving the said clutch-sleeve $I^2$ in and out of gear with the clutch-sleeve I, a fast pulley $g^2$, and loose pulleys $g$ $g'$, a lever, belt-shifting levers actuated thereby to shift the belts on the pulleys, a rod or shaft M, a sleeve N, fixed to said shaft and engaging with the belt-shifting lever, and a cam-sleeve S, adapted to turn with the said rod, but through which the rod can slide freely, said cam-sleeves engaging with the clutch-lever, with a handle on the rod M, substantially as described.

5. The combination, in a device for operating clutching or belt-shifting mechanism, of the shifting-rod, a fixed handle thereon for rotating said rod, and a handle for longitudinally moving the rod, substantially as and for the purpose described.

6. The combination, in a device for operating clutching or belt-shifting mechanism, of the shifting-rod, a handle thereon, a longitudinal groove $u$ and a transverse groove $u'$ in the rod, and a fixed pin adapted to said grooves, substantially as and for the purpose set forth.

In testimony whereof I have signed my name to this specification in the presence of two subscribing witnesses.

FREDERICK B. MILES.

Witnesses:
HENRY HOWSON,
HARRY SMITH.